(12) United States Patent
Nakajima et al.

(10) Patent No.: US 7,795,353 B2
(45) Date of Patent: Sep. 14, 2010

(54) METHOD FOR PRODUCING A MODIFIED PROPYLENE POLYMER

(75) Inventors: Hiroyoshi Nakajima, Ichihara (JP); Shuichi Kimata, Pasadena, CA (US); Susumu Kanzaki, Kisarazu (JP)

(73) Assignee: Sumitomo Chemical Company Limited, Tokyo (JP)

( * ) Notice: Subject to any disclaimer, the term of this patent is extended or adjusted under 35 U.S.C. 154(b) by 761 days.

(21) Appl. No.: 11/270,453

(22) Filed: Nov. 10, 2005

(65) Prior Publication Data

US 2006/0148995 A1    Jul. 6, 2006

(30) Foreign Application Priority Data

Nov. 12, 2004    (JP) .............................. 2004-328687

(51) Int. Cl.
*C08F 110/04*    (2006.01)
(52) U.S. Cl. ..................................................... 525/244
(58) Field of Classification Search ................... 525/244
See application file for complete search history.

(56) References Cited

U.S. PATENT DOCUMENTS 4,985,502 A  *  1/1991  Izumi et al. ................. 525/194
5,300,568 A  *  4/1994  Abe et al. ..................... 525/68
5,866,712 A  *  2/1999  Sanchez et al. ............. 560/170

FOREIGN PATENT DOCUMENTS

| JP | 9-3140 A | | 1/1997 |
| JP | 9003140 | * | 1/1997 |
| JP | 2002-20436 A | | 1/2002 |
| JP | 2002020436 | * | 1/2002 |

* cited by examiner

*Primary Examiner*—Robert D. Harlan
(74) *Attorney, Agent, or Firm*—Birch, Stewart, Kolasch & Birch, LLP

(57) ABSTRACT

Disclosed is a method for producing a modified propylene polymer, the method comprising heating a mixture of 100 parts by weight of a propylene polymer (A) defined below and from 0.1 to 50 parts by weight of an ethylenically unsaturated bond-containing monomer (B) in the presence of from 0.01 to 20 parts by weight of an organic peroxide (C); propylene polymer (A) being a propylene polymer composed of from 0.5 to 90% by weight of a propylene polymer component (A1) having an intrinsic viscosity $[\eta]$, as measured in tetralin at 135° C., of from 5 dl/g to 15 dl/g and from 10 to 99.5% by weight of a propylene polymer component (A2) having an intrinsic viscosity $[\eta]$, as measured in tetralin at 135° C., of not less than 0.1 dl/g but less than 5 dl/g.

2 Claims, No Drawings

METHOD FOR PRODUCING A MODIFIED PROPYLENE POLYMER

BACKGROUND OF THE INVENTION

1. Field of the Invention

The present invention relates to a method for producing a modified propylene polymer, and particularly, to a method which can produce a modified propylene polymer which has a wide molecular weight distribution and is superior in fluidity.

2. Description of the Related Art

Propylene polymers are used in a wide variety of applications such as automotive components and components of household electric appliances due to their superior mechanical properties. It is known to modify a propylene polymer by grafting an unsaturated carboxylic acid or its derivative to the propylene polymer.

For example, JP 9-3140 A discloses a method for producing a graft modified propylene polymer by graft copolymerizing a polar monomer to a propylene homopolymer having an intrinsic viscosity of from 0.1 to 20 dl/g.

JP 2002-20436 A discloses a method for producing a modified polypropylene resin by melt-kneading an ultra high molecular weight crystalline polypropylene resin having an intrinsic viscosity of from 5 to 15 dl/g with a mixture including an ethylenically unsaturated bond-containing monomer and an organic peroxide.

However, modified propylene polymers obtained by the methods disclosed in the above-cited references do not always have high molecular weight distributions and a further improvement in their fluidity has been demanded.

SUMMARY OF THE INVENTION

Under such circumstances, an object of the present invention is to provide a method suitable for producing a modified propylene polymer which has a wide molecular weight distribution and is superior in fluidity in the molten state.

The present invention provides, in one aspect, a method for producing a modified propylene polymer, the method comprising heating a mixture of 100 parts by weight of a propylene polymer (A) defined below and from 0.1 to 50 parts by weight of an ethylenically unsaturated bond-containing monomer (B) in the presence of from 0.01 to 20 parts by weight of an organic peroxide (C);

Propylene Polymer (A)

a propylene polymer composed of from 0.5 to 90% by weight of a propylene polymer component (A1) having an intrinsic viscosity $[\eta]$, as measured in tetralin at 135° C., of from 5 dl/g to 15 dl/g and from 10 to 99.5% by weight of a propylene polymer component (A2) having an intrinsic viscosity $[\eta]$, as measured in tetralin at 135° C., of not less than 0.1 dl/g but less than 5 dl/g, provided that the overall weight of the propylene polymer (A) composed of the component (A1) and the component (A2) is 100% by weight.

The present invention provides, in another aspect, a modified propylene polymer obtained by the above-mentioned method. This modified propylene polymer has a wide molecular weight distribution and is superior in fluidity.

According to the present invention, it is possible to produce a modified propylene polymer which has a wide molecular weight distribution and is superior in fluidity.

DESCRIPTION OF THE PREFERRED EMBODIMENTS

The propylene polymer (A) used in the method of the present invention is composed of a propylene polymer component (A1) having an intrinsic viscosity $[\eta]$, as measured in tetralin at 135° C., of from 5 dl/g to 15 dl/g and a propylene polymer component (A2) having an intrinsic viscosity $[\eta]$, as measured in tetralin at 135° C., of not less than 0.1 dl/g but less than 5 dl/g.

The component (A1) is a propylene polymer obtained by polymerizing monomers mainly including propylene (typically 50 mole % or more), examples of which polymer include propylene homopolymers obtained by homopolymerizing propylene, propylene-ethylene random copolymers, propylene-α-olefin random copolymers obtained by copolymerizing propylene and an α-olefin having from 4 to 12 carbon atoms, propylene-ethylene-α-olefin random copolymers, and propylene block copolymers prepared by homopolymerizing propylene and then copolymerizing ethylene and propylene. Examples of the α-olefin having from 4 to 12 carbon atoms include 1-butene, 4-methylpentene-1, 1-octene and 1-hexene.

The component (A1) preferably is a crystalline propylene polymer, examples of which include homopolymers of propylene and crystalline copolymers obtained by copolymerization of propylene and one or more monomers selected from the group consisting of ethylene and α-olefins having from 4 to 12 carbon atoms. More preferably, the component (A1) is selected from propylene homopolymers and propylene-ethylene random copolymers having an ethylene content of from 0.5 to 8% by weight.

The component (A1) has an intrinsic viscosity $[\eta]$, as measured in tetralin at 135° C., of from 5 dl/g to 15 dl/g, preferably from 6 dl/g to 15 dl/g, and more preferably from 6 dl/g to 9 dl/g. Modification of a propylene polymer composed only of a component having an intrinsic viscosity $[\eta]$ of less than 5 dl/g or modification of a propylene polymer including much component having an $[\eta]$ of less than 5 dl/g together with less than 0.05% by weight of the propylene polymer component (A1) having an $[\eta]$ of from 5 dl/g to 15 dl/g may afford a modified propylene polymer having a narrow molecular weight distribution and a poor fluidity. On the other hand, in the case of a propylene polymer composed of a propylene polymer component having an intrinsic viscosity $[\eta]$ of greater than 15 dl/g and the propylene polymer component (A2) having an $[\eta]$ of not less than 0.1 dl/g but less than 5 dl/g, the propylene polymer has a too high melt viscosity and, therefore, it may be difficult to carry out heat treatment for the modification of the propylene polymer.

It is possible to form the propylene polymer component having an $[\eta]$ of from 5 dl/g to 15 dl/g by setting the polymerization rate relatively high or suppressing a chain transfer reaction or a stopping reaction; specifically, by using an increased concentration of propylene, using a reduced concentration of chain transfer agent, or using an optimized polymerization temperature during the polymerization.

The component (A1) preferably has a melting peak temperature $Tm^{41}$ of a programmed-temperature thermogram, as measured by differential scanning calorimetry (DSC), of from 130 to 170° C., more preferably from 145 to 165° C.

The component (A2) is a propylene polymer obtained by polymerizing monomers mainly including propylene (typically 50 mole % or more), examples of which polymer include propylene homopolymers obtained by homopolymerizing propylene, propylene-ethylene random copolymers, propylene-ethylene block copolymers, propylene-α-olefin random copolymers obtained by copolymerizing propylene and an α-olefin having from 4 to 12 carbon atoms, propylene-ethylene-α-olefin random copolymers, and propylene block copolymers prepared by homopolymerizing propylene and then copolymerizing ethylene and propylene. Examples of the α-olefin having from 4 to 12 carbon atoms include 1-butene, 4-methylpentene-1,1-octene and 1-hexene.

The component (A2) has an intrinsic viscosity [η], as measured in tetralin at 135° C., of not less than 0.1 dl/g but less than 5 dl/g, preferably from 0.3 dl/g to 3 dl/g, and more preferably from 0.5 dl/g to 1.5 dl/g. In the case of a propylene polymer composed of a propylene polymer component having an intrinsic viscosity [η] of less than 0.1 dl/g and the propylene polymer component (A1) having an [η] of from 5 dl/g to 15 dl/g, the production stability of a modified propylene polymer may be reduced. Modification of a propylene polymer composed only of a component having an intrinsic viscosity [η]of not less than 5 dl/g or modification of a propylene polymer including much component having an [η]of not less than 5 dl/g together with less than 10% by weight of the propylene polymer component (A2) having an [η] of not less than 0.1 dl/g but less than 5 dl/g may afford a modified propylene polymer having a narrow molecular weight distribution and a poor fluidity.

It is possible to produce the propylene polymer component having an [η]of not less than 0.1 dl/g but less than 5 dl/g by setting a polymerization rate relatively low or promoting a chain transfer reaction or a stopping reaction; specifically, by using an reduced concentration of propylene, using an increased concentration of chain transfer agent, using an optimized polymerization temperature, or reducing a catalyst activity during the polymerization.

The component (A2) preferably has a melting peak temperature $Tm^{A2}$ of a programmed-temperature thermogram, as measured by DSC, of from 130 to 170° C., more preferably from 145 to 165° C.

The intrinsic viscosity $[\eta]^T$ of the overall propylene polymer (A), as measured in tetralin at 135° C., is preferably from 3 dl/g to 15 dl/g, more preferably from 4 dl/g to 15 dl/g, and even more preferably from 5 dl/g to 10 dl/g.

The ratio of the weight average molecular weight to the number average molecular weight, Mw/Mn, as measured by gel permeation chromatography (GPC), of the propylene polymer (A) is preferably not less than 3 but less than 10, more preferably from 3 to 8, and even more preferably from 3 to 7. The Mw/Mn is also referred to a molecular weight distribution or a Q factor.

The content of the component (A1) included in the propylene polymer (A) is from 0.5 to 90% by weight, preferably from 10 to 85% by weight, more preferably from 40 to 75% by weight, and even more preferably from 51 to 75% by weight. In other words, the content of the component (A2) is from 10 to 99.5% by weight, preferably from 15 to 90% by weight, more preferably from 25 to 60% by weight, and even more preferably from 25 to 49% by weight.

In the case where the content of the component (A1) is less than 0.5% by weight, a modified propylene polymer having a narrow molecular weight distribution may be obtained and, therefore, a modified propylene polymer superior in fluidity may not be produced. If the content of the component (A1) is over 90% by weight, the propylene polymer has a too high melt viscosity and, therefore, it may be difficult to carry out heat treatment for the modification of the propylene polymer.

The method for producing the propylene polymer (A) are exemplified by methods (I) through (III) shown below.

Method (I): a method in which a powder of the component (A1) and a powder of the component (A2) are mixed.

Method (II): a method in which polymerization is carried out according to the methods disclosed in JP 5-239149 A, U.S. 2002/0103302 A1, U.S. Pat. No. 6,110,986, and U.S. 2005/0154131 A1.

Method (III): a method in which a polymer (A) prepared by the method (II) mentioned above and a powder of a component (A1) and/or a powder of a component (A2), which have been prepared separately from the polymer (A), are mixed.

The polymerization catalyst for use in the method (II) mentioned above may be catalyst systems, such as those disclosed in U.S. Pat. Nos. 5,608,018, 6,187,883 and 4,983,561, comprising (a) a solid catalyst component including, as essential ingredients, magnesium, titanium, halogen and an electron donor, (b) an organoaluminum compound and (c) an electron-donating component.

The polymerization for use in the method (II) mentioned above may be, for example, bulk polymerization, solution polymerization, slurry polymerization and vapor phase polymerization. These polymerization methods may be carried out either batchwise or continuously. Moreover, these polymerization methods may be combined together at will.

One preferable example of the method (II) is a method in which, in a polymerization apparatus including two or more polymerization reactors arranged in series, a component (A1) is produced by polymerization in the presence of a catalyst system comprising (a) a solid catalyst component like that mentioned above, (b) an organoaluminum compound and (c) an electron-donating component in one reactor, then the resulting component (A1) is transferred to the next reactor, and a component (A2) is produced by polymerization. Preferred from an industrial and economic points of view is continuous vapor phase polymerization.

The amounts of the solid catalyst component (a), the organoaluminum compound (b) and the electron-donating component (c) for use in the method (II) mentioned above, and the methods for feeding these catalyst components may be determined at will.

The polymerization temperature is typically from −30 to 300° C., preferably from 20 to 180° C. The polymerization pressure is typically from normal pressure to 10 MPa, preferably from 0.2 to 5 MPa. A molecular weight regulator such as hydrogen may be used.

In the production of the propylene polymer (A), pre-polymerization may be carried out before the main polymerization. The pre-polymerization may be carried out by feeding a small amount of propylene in the presence of a solid catalyst component (a) and an organoaluminum compound (b) in a slurry state using a solvent.

The ethylenically unsaturated bond-containing monomer (B) is preferably selected from compounds having at least one ethylenically unsaturated bond in the molecule and compounds which undergo dehydration during the modification of a propylene polymer (A) so as to be structurally changed to have a structure having at least one ethylenically unsaturated bond in the molecule.

The ethylenically unsaturated bond-containing monomer (B) is preferably liquid at 25° C. and 1 atm.

The ethylenically unsaturated bond-containing monomer (B) is preferably selected from monomers having at least one functional group selected from a hydroxyl group, a carboxyl group, an epoxy group, an amino group, an amide group, an imidazole group, a pyridine group, a piperidine group, a silyl group, a cyano group, an isocyanate group and an oxazoline group; acid anhydrides, ester compounds, amide compounds and metal salts derived from monomers having a carboxyl group; ester compounds and metal salts derived from monomers having a hydroxyl group; and amide compounds and metal salts derived from monomers having an amino group.

The ethylenically unsaturated bond-containing polar monomer is more preferably a hydroxyl group-containing compound, a carboxyl group-containing compound or its anhydride, an epoxy group-containing compound or an amino group-containing compound, and even more preferably a hydroxyl group-containing compound, a carboxyl group-containing compound or its anhydride.

Examples of the hydroxyl group-containing compound include compounds represented by the structural formula (1) or (2) shown below.

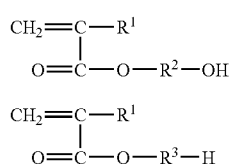

(in structural formulas (1) and (2), $R^1$ represents, in each occurrence, a hydrogen atom or an alkyl group having from 1 to 6 carbon atoms; $R^2$ represents an alkylene group having from 1 to 20 carbon atoms or a cycloalkylene group; and $R^3$ represents $(C_nH_{2n}O)_m$.)

Examples of the compounds represented by the structural formula (1) or (2) include (meth)acrylates such as 2-hydroxymethyl (meth)acrylate, 2-hydroxyethyl (meth)acrylate, 2-hydroxypropyl (meth)acrylate, 2-hydroxybutyl (meth)acrylate, polyethylene glycol mono(meth)acrylate, polypropylene glycol mono(meth)acrylate, poly(ethylene glycol-propylene glycol) mono(meth)acrylate, poly(ethylene glycol-tetramethylene glycol) mono(meth)acrylate, poly (propylene glycol-tetramethylene glycol) mono(meth)acrylate, and poly(propylene glycol-butylene glycol) mono (meth)acrylate.

Examples of hydroxyl group-containing compounds other than the compounds represented by the structural formula (1) or (2) include unsaturated alcohols such as allyl alcohol, 9-decen-1-ol, 10-undecen-1-ol and propargyl alcohol; vinyl ethers such as 2-hydroxyethyl vinyl ether, diethylene glycol monovinyl ether, and 4-hydroxybutyl vinyl ether; allyl ethers such as 2-hydroxyethyl allyl ether; and alkenylphenols such as p-vinylphenol and 2-propenylphenol.

Examples of the carboxyl group-containing compound include unsaturated dicarboxylic acids such as maleic acid, fumaric acid, chloromaleic acid, himic acid, citraconic acid and itaconic acid; unsaturated monocarboxylic acids such as acrylic acid, butanoic acid, crotonic acid, vinylacetic acid, methacrylic acid, pentenoic acid, dodecenoic acid, linoleic acid, angelic acid and cinnamic acid; anhydrides of the aforementioned unsaturated dicarboxylic acids or unsaturated monocarboxylic acids such as maleic anhydride, himic anhydride and acrylic anhydride; and alkyl esters of the aforementioned unsaturated dicarboxylic acids or unsaturated monocarboxylic acids.

Examples of the epoxy group-containing compound include glycidy (meth)acrylate, (meth)acryl glycidyl ether and allyl glycidyl ether.

Examples of the amino group-containing compound include tertiary amino group-containing (meth)acrylates such as dimethylaminomethyl (meth)acrylate, dimethylaminoethyl (meth)acrylate, dimethylaminopropyl (meth)acrylate and diethylaminoethyl (meth)acrylate; vinylmorpholines such as 4-vinylmorpholine, 2-methyl-4-vinyl morpholine and 4-allylmorpholine; tertiary amino group-containing unsaturated imide compounds, which are products of reactions between unsaturated carboxylic anhydrides, such as maleic anhydride and itaconic anhydride, and amine compounds; tertiary amino group-containing (meth)acrylamide such as imethylaminomethyl (meth) acrylamide, dimethylaminoethyl (meth) acrylamide, dimethylaminopropyl (meth) acrylamide; tertiary amino group-containing aromatic vinyl compounds; and quaternary ammonium salt group-containing unsaturated compounds prepared by cationizing tertiary amino group-containing unsaturated compounds with cationizing agents, such as N,N,N-trimethyl-N-(2-hydroxy-3-methacryloyloxypropyl) ammonium chloride.

Examples of the cationizing agents include alkyl halide derivatives such as methyl chloride, ethyl chloride, butyl chloride, octyl chloride, lauryl chloride, stearyl chloride, cyclohexyl chloride, benzyl chloride, phenethyl chloride, allyl chloride, methyl bromide, ethyl bromide, butyl bromide, octyl bromide, lauryl bromide, stearyl bromide, benzyl bromide, allyl bromide, methyl iodide, ethyl iodide, butyl iodide, octyl iodide, lauryl iodide, stearyl iodide and benzyl iodide; alkyl haloacetates such as methyl monochloroacetate, ethyl monochloroacetate and ethyl bromoacetate; dialkyl sulfates such as dimethyl sulfate and diethyl sulfate; inorganic acids such as hydrochloric acid, hydrobromic acid, sulfuric acid and phosphoric acid; organic acids such as formic acid, acetic acid and propionic acid; and epichlorohydrin adducts of tertiary amine mineral acid salts such as N-(3-chloro-2-hydroxypropyl)-N,N,N-trimethylammonium chloride.

Examples of the amide group-containing compound include (meth)acrylamide, dimethyl(meth)acrylamide, diethyl(meth)acrylamide, N-methylol(meth)acrylamide, N-butoxydimethyl(meth)acrylamide and N-isopropylacrylamide.

Examples of the imidazole group-containing compound include vinylimidazoles such as 1-vinylimidazole, 2-methyl-1-vinylimidazole, 4-methyl-1-vinylimidazole, 5-methyl-1-vinylimidazole, 2-lauryl-1-vinylimidazole and 4-tert-butyl-1-vinylimidazole.

Examples of the pyridine group-containing compound include 2-vinylpyridine, 3-vinylpyridine, 4-vinylpyridine, 2-methyl-5-vinylpyridine, 3-methyl-5-vinylpyridine, 4-methyl-5-vinylpyridine, 6-methyl-5-vinylpyridine, 2-methyl-4-vinylpyridine, 3-methyl-4-vinylpyridine, 2-lauryl-4-vinylpyridine, 2-lauryl-5-vinylpyridine, 2-tert-butyl-4-vinylpyridine and 2-tert-butyl-5-vinylpyridine.

Examples of the piperidine group-containing compound include vinyl piperidines such as 1-vinylpiperidine and 4-methyl-4-vinylpiperidine and vinylpiperazines such as 2-lauryl-1-vinylpiperazine and 4-methylpiperazinoethyl (meth)acrylate.

Examples of the silyl group-containing compound include vinyltrimethoxysilane, vinyltriethoxysilane, vinyltributoxysilane, 3-methacryloxypropyltrimethoxysilane, 3-methacryloxypropylmethyldimethoxysilane, 3-methacryloxypropylmethyldiethoxysilane, 3-acryloxypropyltrimethoxysilane, p-styryltrimethoxysilane and vinyltris(2-methoxyethoxy)silane.

Examples of the cyano group-containing compound include (meth)acrylonitrile.

Examples of the isocyanate group-containing compound include (meth)acryloyl isocyanate, crotyl isocyanate, isocyanatoethyl crotonate, isocyanatobutyl crotonate, isocyanatoethyl ethylene glycol crotonate, isocyanatoethyl diethylene glycol crotonate, isocyanatoethyl triethylene glycol crotonate, isocyanatoethyl (meth)acrylate, isocyanatobutyl (meth)acrylate, isocyanatohexyl (meth)acrylate, isocyanatooctyl (meth)acrylate, isocyanatolauryl (meth)acrylate, isocyanatohexadecyl (meth)acrylate, isocyanato ethylene glycol (meth) acrylate, isocyanatoethyl diethylene glycol (meth)acrylate and isocyanatoethyl triethylene glycol (meth)acrylate.

Examples of the oxazoline group-containing monomer include 2-vinyl-2-oxazoline, 2-vinyl-4-methyl-2-oxazoline, 2-isopropenyl-2-oxazoline and 2-isopropenyl-4-oxazoline.

The amount of the ethylenically unsaturated bond-containing monomer (B) to be added is from 0.1 to 20 parts by weight, preferably from 0.5 to 15 parts by weight, and more preferably from 1 to 15 parts by weight per 100 parts by weight of the propylene polymer (A). If the amount of the ethylenically unsaturated bond-containing monomer (B) added is too small, the graft amount of the monomer (B) in a modified propylene polymer obtained from the propylene polymer may be lowered. If too much monomer (B) is added, properties of the mixture under or after the modification may be deteriorated and much unreacted ethylenically unsaturated bond-containing monomer (B) may remain in the resulting modified propylene polymer; this may result in an insufficient adhesion strength when the modified propylene polymer is used in adhesive applications.

The organic peroxide (C) used in the present invention may be conventionally known organic peroxides, examples of which include an organic peroxide such that the temperature at which the half-life thereof is one minute is lower than 120° C. Examples thereof include diacylperoxide compounds, percarbonate compounds (compounds (I) having a structure represented by structural formula (3) shown below in the molecule) and alkyl perester compounds (compounds (II) having a structure represented by structural formula (4)).

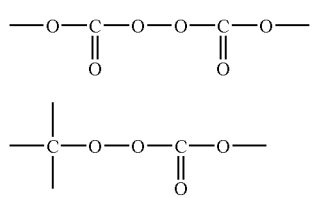

Examples of the compounds (I) having a structure represented by structural formula (3) include di-3-methoxybutyl peroxydicarbonate, di-2-ethylhexyl peroxydicarbonate, bis (4-tert-butylcyclohexyl) peroxydicarbonate, diisopropyl peroxydicarbonate, tert-butylperoxy isopropylcarbonate and dimyristyl peroxycarbonate. Examples of the compounds (II) having a structure represented by structural formula (4) include 1,1,3,3-tetramethylbutyl neodecanoate, α-cumyl peroxyneodecanoate and tert-butyl peroxyneodecanoate.

In addition, an organic peroxide such that the temperature at which the half-life thereof is one minute is 120° C. or higher may also be used. Examples thereof include
1,1-bis(tert-butylperoxy)cyclohexane,
2,2-bis (4,4-di-tert-butylperoxycyclohexyl)propane,
1,1-bis (tert-butylperoxy)cyclododecane,
tert-hexylperoxyisopropyl monocarbonate,
tert-butylperoxy-3,5,5-trimethyl hexanoate, tert-butyl peroxylaurate, 2,5-dimethyl-2,5-di(bezoylperoxy)hexane,
tert-butyl peroxyacetate, 2,2-bis(tert-butylperoxy)butene,
tert-butylperoxybenzoate,
n-butyl-4,4-bis(tert-butylperoxy)valerate, di-tert-butyl peroxyisophthalate, dicumylperoxide,
α,α'-bis(tert-butylperoxy-m-isopropyl)benzene,
2,5-dimethyl-2,5-di (tert-butylperoxy)hexane,
1,3-bis (tert-butylperoxydiisopropyl)benzene,
tert-butylcumylperoxide, di-tert-butylperoxide, p-menthane hydroperoxide and
2,5-dimethyl-2,5-di (tert-butylperoxy)hexyne-3.

The amount of the organic peroxide (C) to be added is from 0.01 to 20 parts by weight, preferably from 0.03 to 1.0 part by weight per 100 parts by weight of the propylene polymer (A). If the amount of the organic peroxide (C) added is too small, the graft amount of the monomer (B) in a modified propylene polymer obtained from the propylene polymer (A) may be lowered. If too much organic peroxide (C) is added, the decomposition of the propylene polymer (A) may promoted too much during the preparation of the modified propylene polymer.

When the ethylenically unsaturated bond-containing monomer (B) is liquid at 25° C., 1 atm, the production efficiency of the modified propylene polymer of the present invention may be increased by use of a material which is capable of being impregnated with liquid, such as an organic porous powder (D).

Examples of the organic porous powder (D) include powdery or granular polymer having a particle size of from 1 to 7000 μm, a specific surface area of from 0.1 to 1000 m²/g, a pore size of from 0.05 to 10 μm and a porosity of from 5 to 90%.

The specific surface area of the organic porous powder (D) is preferably from 10 to 800 m²/g, more preferably from 30 to 300 m²/g. The porosity of the organic porous powder is preferably from 30 to 85%, more preferably from 50 to 85%.

The organic porous powder (D) is insoluble both in the ethylenically unsaturated bond-containing monomer (B) and in the organic peroxide (C).

Examples of the organic porous powder (D) include α-olefin polymers such as ethylene polymers, propylene polymers, butene polymers, ethylene-propylene copolymers, ethylene-butene-1 copolymers, ethylene-hexene-1 copolymers, propylene-butene-1 copolymers, propylene-hexene-1 copolymers and propylene-divinylbenzene copolymers; aromatic unsaturated hydrocarbon polymers such as polystyrene and styrene-divinylbenzene copolymers; and polar group-containing polymers such as polyacrylate, polymethacrylate, polyacrylonitrile, polyvinylchloride, polyamide, polyphenylene ether, polyethylene terephthalate and polycarbonate.

The organic porous powder (D) may be produced, for example, by forming micropores in polymer particles through a treatment using a solvent possessing a moderate ability to dissolve the polymer. Such an organic porous powder is commercially available. For example, those available under the name of ACCUREL from MEMBRANA including several grades may be used.

The modified propylene polymer of the present invention produced by the above-described method has a wider molecular weight distribution, namely, a greater Q factor determined by GPC, and a better fluidity in comparison with conventional modified propylene polymers.

The intrinsic viscosity [η], as measured in tetralin at 135° C., of the modified propylene polymer of the present invention is preferably from 0.5 to 2 dl/g, more preferably from 0.7 to 1.5 dl/g. It is possible to adjust the [η] of the modified propylene polymer by appropriately adjusting the amount of the organic peroxide used in the modification or the [η] of the propylene polymer (A).

The Q factor (Mw/Mn), as measured by gel permeation chromatography (GPC), of the modified propylene polymer of the present invention is preferably from 2 to 8, more preferably from 2.5 to 6, and even more preferably from 3 to 6. The Q factor of the modified propylene polymer may be adjusted by appropriately adjusting the Q factor of the propylene polymer (A) used in the modification.

The modified propylene polymer of the present invention preferably has a melting peak temperature $T_m$ of a programmed-temperature thermogram, as measured by DSC, of from 130 to 170° C., more preferably from 140 to 165° C., and even more preferably from 150 to 165° C.

The modified propylene polymer of the present invention may contain an additive and filler. Examples of the additive include antioxidants, neutralizing agents, weathering agents, UV absorbers, copper inhibitors, lubricants, processing aids, plasticizers, dispersing agents, anti-blocking agents, antistatic agents, nucleating agents, flame retardants, foaming agents, foam inhibitors, crosslinking agents and colorants.

Examples of the filler include glass fiber, carbon fiber, metal fiber, glass beads, mica, granular or tabular calcium carbonate, potassium titanate whisker, talc, fibrous magnesium oxysulfate, aramid fiber, granular or tabular barium sulfate, glass flakes and fibrous fluororesin.

For the preparation of the modified propylene polymer of the present invention, conventionally known techniques may be applied. Examples thereof are:

(1) solution method comprising heating the components in an appropriate organic solvent; and
(2) melt-kneading method comprising mixing the components simultaneously or mixing them separately in an appropriate order to form a homogeneous mixture using a mixing device such as a Henschel mixer and a ribbon blender, followed by heating the mixture in a melt-kneading apparatus such as an extruder. Preferred is the melt-kneading method. Solvents suitably used in the solution method are those which do not consume radicals generating from the organic peroxide and which are easy to be evaporated.

The method for melt-kneading to be used in the method (2) may be conventional melt-kneading methods using a Bambury mixer, a plastomill, a Brabender plastograph, a single screw extruder, a twin screw extruder, or the like. Preferable methods are a method in which a single or twin screw extruder is used and a propylene polymer (A), an ethylenically unsaturated bond-containing monomer (B) and an organic peroxide (C) are fed into the extruder through a feed port(s), followed by melt kneading; and a method in which a propylene polymer (A) and an organic peroxide (C) are charged through a feed port and then an ethylenically unsaturated bond-containing monomer (B) and another portion of organic peroxide (C) are fed at the middle of the extruder using a liquid additive feeder.

The temperature of a kneading section of the melt-kneading apparatus (for example, the cylinder temperature of an extruder) is typically from 50 to 300° C., preferably from 100 to 250° C. Regarding the temperature of the kneading section of the melt-kneading apparatus, the kneading process may be divided into the first and second halves wherein the temperature at the second half is set higher than that of the first half. The kneading time is typically from 0.1 to 30 minutes, preferably from 0.5 to 5 minutes.

EXAMPLES

The present invention will be explained below with reference to examples and comparative example. Physical properties of the polymers used in the examples and comparative example were measured by the methods described below.

(1) Intrinsic Viscosity of Propylene Polymer Prepared by One-Step Polymerization: [η](Unit: dl/g)

Reduced viscosities were measured at three points of concentrations of 0.1, 0.2 and 0.5 g/dl using a Ubbelohde's viscometer. The intrinsic viscosity was calculated by a calculation method described in "Kobunshi Yoeki (Polymer Solution), Kobunshi Jikkengaku (Polymer Experiment Study) 11" page 491 (published by Kyoritsu Shuppan Co., Ltd., 1982), namely, by an extrapolation method in which reduced viscosities are plotted against concentrations and the concentration is extrapolated in zero. The measurements were carried out at 135° C. using tetralin as a solvent.

(2) Intrinsic Viscosity of Propylene Polymer Prepared by Two-Step Polymerization: $[\eta]^{41}$, $[\eta]^{42}$ (Unit: dl/g)

The intrinsic viscosity $[\eta]^{41}$ of a sample taken out from a reactor after the first polymerization step and the intrinsic viscosity $[\eta]^T$ of a final sample after the second polymerization step were measured using the method described in (1) above. The intrinsic viscosity $[\eta]^{42}$ of the component produced in the second step was calculated by using the following equation:

$$[\eta]^{42}=([\eta]^T-[\eta]^{41} \times X^{41})/X^{42}$$

$[\eta]^T$: the intrinsic viscosity (dl/g) of the final sample after the second polymerization step $[\eta]^{41}$: the intrinsic viscosity (dl/g) of the sample taken out from a reactor after the first polymerization step $X^{41}$: the weight ratio of the component produced in the polymerization in the first step $X^{42}$: the weight ratio of the component produced in the polymerization in the second step $X^{41}$ and $X^{42}$ were determined on the basis of the material balance during the polymerizations. The total of $X^{41}$ and $X^{42}$ is 1.

(3) Melting Peak Temperature ($T_m$, Unit: ° C.)

By use of a differential scanning calorimeter (DSC-7, manufactured by PerkinElmer, Inc.), a sample was heated at 220° C. for 5 minutes, cooled to 150° C. with a rate of 300° C./min., held at 150° C. for 1 min., cooled to 50° C. with a rate of 5° C./min., and held at 50° C. for 1 min. The sample was further heated from 50° C. to 180° C. with a rate of 5° C./min. and the melting peak temperature $T_m$ was determined.

(4) Molecular Weight Distribution (Q Factor, $M_w/M_n$)

The molecular weight distribution was measured by gel permeation chromatography (GPC) under the conditions provided below.

Instrument: Model 150CV (manufactured by Millipore Waters Co.)

Column: Shodex M/S 80

Measurement Temperature: 145° C.

Solvent: o-Dichlorobenzene

Sample concentration: 5 mg/8 mL

A calibration curve was produced using standard polystyrenes. The $M_w/M_n$ of a standard polystyrene (NBS706: $M_w/M_n$=2.0) measured under the above conditions was 1.9 to 2.1.

(5) Content of 2-hydroxyethyl methacrylate (HEMA) (Unit: % by Weight)

A sample was hot pressed to form a film having a thickness of about 100 μm. The infrared absorption spectrum of the so-prepared film was measured and the HEMA content was determined on the basis of the absorption in the vicinity of 1730 cm$^{-1}$.

The materials used in the examples and comparative example are provided below.

(A) Propylene Polymer

PP1: A propylene homopolymer prepared by use of the method for preparing a propylene polymer HMS-3 disclosed in a working example in Japanese Patent Laid-Open No. 2005-146160. As shown in Table 1, the polymer is composed of propylene polymer component (A1) and propylene polymer components (A2). Both (A1) and (A2) are propylene homopolymers.

PP2: Propylene homopolymer corresponding to propylene polymer component (A2); [η]: 0.75 dl/g; prepared by vapor phase polymerization using a solid catalyst component described in U.S. Pat. No. 5,608,018 (Japanese Patent Laid-Open No. 7-216017).

PP3: Propylene homopolymer corresponding to propylene polymer component (A2); [η]: 3.0 dl/g; prepared by vapor phase polymerization using a solid catalyst component described in U.S. Pat. No. 5,608,018 (Japanese Patent Laid-Open No. 7-216017).

(B) Ethylenically Unsaturated Bond-Containing Monomer

HEMA: 2-hydroxyethylmethacrylate (manufactured by Tokyo Kasei Kogyo Co., Ltd.)

(C) Organic Peroxide

Kb-B: tert-Butylperoxybenzoate (KAYABUTYL B, manufactured by Kayaku Akzo Corporation)

(D) Organic Porous Powder

MP-1000: MP-1000, manufactured by MEMABRANA)

(E) Nucleating Agent

NA-11: Sodium 2,2'-methylene-bis-(4,6-di-tert-butylphenyl) phosphate (ADK STAB NA-11, manufactured by Asahi Denka Co., Ltd.)

Example 1

PP 1, HEMA, Kb-B, MP-1000, NA-11 and stabilizers (IRGANOX 1010 and IRGAFOS 168, both manufactured by Ciba Specialty Chemicals) were mixed uniformly. Subsequently, the mixture was melt kneaded by means of a twin screw kneading extruder (commercial name: KZW15-45MG, manufactured by Technovel Corp.; co-rotating screw 15 mm×45 L/D), at a temperature of 180° C. with a screw rotation rate of 500 rpm. Thus, a modified propylene polymer was obtained. The amount relationship of the ingredients combined and physical properties of the resulting modified propylene polymer are shown in Table 2.

Example 2

The operations of Example 1 were repeated except using 50 parts by weight of PP1 and 50 parts by weight of PP2 instead of 100 parts by weight of PP1 as propylene polymer.

Example 3

The operations of Example 1 were repeated except using 25 parts by weight of PP1 and 75 parts by weight of PP2 instead of 100 parts by weight of PP1 as propylene polymer.

Comparative Example 1

The operations of Example 1 were repeated except using 100 parts by weight of PP3 instead of 100 parts by weight of PP1 as propylene polymer.

TABLE 1

|      |                    | PP1  | PP2  | PP3  |
|------|--------------------|------|------|------|
| (A1) | [η] (dl/g)         | 7.8  | —    | —    |
|      | Weight ratio (wt %)| 72   | 0    | 0    |
| (A2) | [η] (dl/g)         | 0.9  | 0.75 | 3.0  |
|      | Weight ratio (wt %)| 28   | 100  | 100  |

TABLE 2

|  |  | Example 1 | Example 2 | Example 3 | Comparative Example 1 |
|---|---|---|---|---|---|
| Amount (parts by weight) | (A1) | 72 | 36 | 18 | 0 |
|  | (A2) | 28 | 64 | 82 | 100 |
|  | (B)  | 12 | 12 | 12 | 12 |
|  | (C)  | 1.5 | 1.5 | 1.5 | 1.5 |
|  | (D)  | 5 | 5 | 5 | 5 |
|  | (E)  | 0.3 | 0.3 | 0.3 | 0.3 |
| Physical properties of modified propylene polymer | Mw/Mn | 3.4 | 4.2 | 3.9 | 2.7 |
|  | [η] (dl/g) | 0.88 | 0.69 | 0.57 | 0.86 |
|  | Content (wt %) of (B) | 3.99 | 4.57 | 4.35 | 3.88 |

In Examples 1-3, the Mw/Mn ratios are high and the fluidities are good.

On the other hand, in Comparative Example 1, which used a polymer including no component (A1) essential in the present invention, the molecular weight distribution (Mw/Mn) was narrow and the fluidity was insufficient.

The invention claimed is:

1. A method for producing a modified propylene polymer, the method comprising heating a mixture of 100 parts by weight of a propylene polymer (A) defined below and from 0.1 to 50 parts by weight of an ethylenically unsaturated bond-containing monomer (B) in the presence of from 0.01 to 20 parts by weight of an organic peroxide (C);

propylene polymer (A):
   a propylene polymer composed of from 0.5 to 90% by weight of a propylene polymer component (A1) having an intrinsic viscosity [η], as measured in tetralin at 135° C., of from 5 dl/g to 15 dl/g and from 10 to 99.5% by weight of a propylene polymer component (A2) having an intrinsic viscosity [η], as measured in tetralin at 135° C., of from 0.3 dl/g to 3 dl/g, provided that the overall weight of the propylene polymer (A) composed of the component (A1) and the component (A2) is 100% by weight,
   wherein the modified propylene polymer has a molecular weight distribution (Mw/Mn) of 3 to 6 measured by gel permeation chromatography (GPC).

2. The method according to claim 1, wherein the ethylenically unsaturated bond-containing monomer (B) is an ethylenically unsaturated bond-containing monomer having at least one functional group selected from the group consisting of a hydroxyl group, a carboxyl group, an epoxy group, an amino group, an amide group, an imidazole group, a pyridine group, a piperidine group, a silyl group, a cyano group, an isocyanate group and an oxazoline group.

* * * * *